United States Patent [19]

Comer

[11] 4,169,159
[45] Sep. 25, 1979

[54] DECOLORING OF PEA FLOUR

[75] Inventor: Frederick W. Comer, Agincourt, Canada

[73] Assignee: The Griffith Laboratories, Limited, Scarborough, Canada

[21] Appl. No.: 817,216

[22] Filed: Jul. 20, 1977

Related U.S. Application Data

[63] Continuation-in-part of Ser. No. 642,238, Dec. 18, 1975, abandoned.

[51] Int. Cl.² ............................................... A21D 2/14
[52] U.S. Cl. ..................................... 426/257; 426/430
[58] Field of Search ............... 426/429, 430, 253, 255, 426/257

[56] References Cited

U.S. PATENT DOCUMENTS

| | | | |
|---|---|---|---|
| 2,216,174 | 10/1940 | Guthrie | 426/253 |
| 3,168,406 | 2/1965 | Moshy | 426/430 |
| 3,520,069 | 7/1970 | Henderson et al. | 260/112 R |

Primary Examiner—Raymond N. Jones
Assistant Examiner—Elizabeth A. Hatcher
Attorney, Agent, or Firm—Fetherstonhaugh & Co.

[57] ABSTRACT

A method of removing orange-brown color causing constituents from yellow pea flour in the manufacture of a high protein pea flour wherein the flour is heat treated including the steps of extracting the flour with a solvent comprising a C1, C2 or C3 monohydric alcohol at a temperature above 40° C. and not more than 30% water by volume to increase the extraction power to remove the brown color causing constituents and then removing the residual solvent from the flour.

6 Claims, No Drawings

DECOLORING OF PEA FLOUR

This invention relates to the decolouring of yellow pea flours, including those that have had their percent protein increased by removal of some of the non-protein components and is a continuation-in-part of application Ser. No. 642,238, filed Dec. 18, 1975, now abandoned.

Dried pea protein flours are an excellent source of vegetable protein. They are made by grinding dried peas. The protein content can be increased by separating starchy components to leave a flour that is high in protein content. They tend, however, to have a bitter taste and a characteristic pea flavour which restricts their use in food products. As described in copending U.S. Pat. No. 4,022,919 issued May 10, 1977, the bitter taste can be removed by heat treatment and the pea flavours can be removed with steam to give products useful in food systems.

Yellow dried pea flours contain yellow pigments characteristic of yellow peas which dominate their appearance in contrast to green peas in which the chlorophyll pigments dominate. Heat treatment under moist conditions can produce orange-brown pigments which then dominate the product appearance. The pigments in yellow pea flours, especially the orange-brown pigments which develop on heat treatment, are objectionable in certain food products.

The chemical nature of the orange-brown pigments in yellow peas which develop on heat treatment is not known. They differ from the yellow pigments present in raw, untreated pea flours in that they are not removed by conventional flour bleaching agents, e.g. dibenzoyl peroxide and chlorine dioxide, whereas the yellow pigments are. It has, however, been found that they are soluble in certain organic solvents under the extraction conditions described in this invention.

The constituents of yellow pea flour that cause the orange-brown colour on heat treatment are not apparent in raw pea flour before heat treatment. They are, however, present and it has been found that they can be removed by organic solvents in accordance with this invention either before heat treatment when they are not visibly apparent or after heat treatment when they are apparent by their orange-brown colour. The yellow pigments apparent in the raw untreated flour are also removed by the solvents in accordance with the invention.

The method of removing colour causing constituents from yellow pea flour according to this invention comprises the steps of extracting the flour with a C1, C2 or C3 monohydric alcohol at a temperature above 40° C. and with not more than 30% water by volume to increase extraction power, and then removing the residual solvent from the flour.

The use of aqueous organic solvents for improving the flavour of vegetable protein concentrates, e.g. soy protein concentrates, is well known. However, vegetable proteins such as soy are very sensitive to protein denaturation by alcohol solvents and the extractions must be carried out at low, ambient temperatures to prevent extensive protein denaturation. Protein denaturation is accompanied by a loss of protein solubility in water.

In many cases of colour extraction with this invention there is little or no protein denaturation. For example, it has been found that yellow pea flours previously treated with moist heat to remove the bitter flavour and the pea flavour can be decoloured in accordance with this invention with little or no further protein denaturation.

As indicated, protein denaturation is accompanied by a loss of protein solubility in water and a generally accepted method for the determination of protein solubility is to measure nitrogen solubility index (N.S.I.) by the method of the American Association of Cereal Chemists (AACC Method 46/23). For many applications vegetable protein products with low N.S.I., e.g. below 25%, tend to lack the functional properties of undenatured, high N.S.I. vegetable protein products in the sense that they have relatively poor emulsification properties in food systems. As will be apparent from the results of experiments set forth in this specification, it is not at all difficult with the method of this invention to decolour yellow pea flours and maintain a high N.S.I. value.

At the same time, lower values of N.S.I. in the order of 10 to 25 may be satisfactory for use in many food systems if they have a relatively high hydration capacity. Some colour removal in accordance with this invention results in a lowering of the N.S.I. value of yellow pea flour to the order of 10 to 25 but at the same time there is an increase in hydration capacity. The combination of reduction in N.S.I. and increase in hydration capacity gives an acceptable water binding capacity for many end products. In every instance the principal object of decolouring the yellow pea protein flour by removing the orange-brown pigments and/or colour causing constituents that result in orange-brown pigments on heat treatment to obtain white or off-white end product is achieved.

Yellow pea flours debittered and deflavoured with moist steam, as described in copending U.S. patent application, were extracted with the solvents in accordance with the conditions of Table I and the solution colour and product examined. The flour had an orange-brown colour. The desired result was in each case to achieve a white or off-white result.

The soluble fraction of the extracted moist heat treated pea flour subjected to an extraction process is an indication of the efficiency of an extraction in reducing colour. For example, if the colour of the solution is orange, it is an indication that the colour extraction has been efficient. If, on the other hand, it is a light yellow or pale orange, it is an indication that it is inefficient and that too much colour has remained in the pea concentrate. Moreover, if the yield of solid content in the soluble fraction is high, it is an indication that substances other than colour have been removed. In many cases, it is protein that is removed. It can also be an indication of denaturing. The following table illustrates the 30 minute extractions of moist heat treated pea flour of concentrated protein content with pure solvents at temperatures indicated. The starting flour had an orange-brown colour caused by its heat treatment which was contacted with steam to cause its temperature to reach about 110° C. for a time duration to debitter it and remove volatiles.

TABLE I

Moist-Heat Treated Pea Flour Organic Solvent Extraction (1:10 solvent ratio)

| Solvent | Extraction time (min.) | Extraction temp. (°C.) | Solution Colour | Prod. Colour | Prod. Yield | Prod. Protein % | AACC NSI $ |
|---|---|---|---|---|---|---|---|
| nil | — | — | — | tan | — | 62 | 60 |
| isopropanol | 30 | 22 | yellow | tan | 96.5 | 64.7 | 58 |
| isopropanol | 30 | 82 | yellow | tan | 94.5 | 66.5 | 60 |
| ethanol | 30 | 22 | yellow | tan | 94.8 | 65.6 | 60 |
| ethanol | 30 | 60 | pale orange | tan | 93.0 | 67.0 | 60 |
| ethanol | 30 | 78 | orange | white | 90.5 | 69.5 | 28 |
| methanol | 30 | 22 | yellow | tan | 93.6 | 66.5 | 60 |
| methanol | 30 | 30 | yellow | tan | 92.0 | 67.1 | 60 |
| methanol | 30 | 40 | pale orange | tan | 91.5 | 68.0 | 60 |
| methanol | 30 | 50 | light orange | off-white | 90.0 | 68.6 | 60 |
| methanol | 30 | 60 | orange | white | 88.9 | 70.0 | 40 |
| methanol | 180 | 60 | orange | white | 88.9 | 70.0 | 35 |

The colour of the product resulting from the extraction should be white or off-white and on the basis of the foregoing results it is apparent that only ethanol and methanol at or near reflux temperatures had sufficient extractive power to give a satisfactory product.

Water was added to the solvents to increase their extractive power and extractions were carried out at room temperatures. Following are the results:

It is apparent that extraction at room temperatures (22° C.) with these aqueous organic solvents, with or without their extractive power increased with water, does not result in a satisfactory product colour. The temperature of the solvents was raised to 60° C. and following are results of tests carried out on colour removal of pea protein concentrate debittered as explained above.

TABLE II

Moist-Heat Treated Pea Flour Aqueous Organic Solvent Extraction at 22° C. (30 min: 1:10 solvent ratio)

| Solvent | Water % (v/v) | Solution Colour | Product Colour | Prod. Yield % | Prod. Protein % | AACC NSI % | Hydration Capacity By AACC Method 56-20 % |
|---|---|---|---|---|---|---|---|
| methanol | 0 | yellow | tan | 93.6 | 62.6 | 60 | 264 |
|  | 10 | yellow | tan | 91.1 | 63.2 | 60 | 279 |
|  | 20 | pale orange | tan | 84.6 | 66.8 | 60 | 294 |
|  | 30 | pale orange | tan | 81.7 | 68.4 | 60 | 306 |
|  | 50 | pale orange | tan | 76.1 | 71.4 | 56 | 333 |
| ethanol | 0 | yellow | tan | 94.8 | 62.6 | 60 | — |
|  | 10 | yellow | tan | 91.7 | 65.4 | 60 | 248 |
|  | 20 | pale orange | tan | 88.1 | 67.0 | 62 | 279 |
|  | 50 | pale orange | tan | 75.4 | 70.5 | 57 | 303 |
| isopropanol | 0 | yellow | tan | 96.5 | 60.7 | 58 | 253 |
|  | 10 | yellow | tan | 93.1 | 65.3 | 60 | 228 |
|  | 20 | pale orange | tan | 90.9 | 66.9 | 59 | 259 |
|  | 30 | pale orange | tan | 87.5 | 69.3 | 59 | 276 |
|  | 50 | pale orange | tan | 76.8 | 70.1 | 54 | 346 |

TABLE III

Moist-Heat Treated Pea Flour Aqueous Organic Solvent Extraction at 60° C. (30 min: 1:10 solvent ratio)

| Solvent | Water % (v/v) | Solution Colour | Product Colour | Prod. Yield % | Prod. Protein % | AACC NSI % | Hydration Capacity By AACC Method 56-20 % |
|---|---|---|---|---|---|---|---|
| methanol | 0 | orange | white | 88.9 | 70.0 | 40 | 252 |
|  | 10 | orange | white | 85.2 | 72.9 | 21 | 315 |

TABLE III-continued

Moist-Heat Treated Pea Flour
Aqueous Organic Solvent Extraction
at 60° C. (30 min: 1:10 solvent ratio)

| Solvent | Water % (v/v) | Solution Colour | Product Colour | Prod. Yield % | Prod. Protein % | AACC NSI % | Hydration Capacity By AACC Method 56-20 % |
|---|---|---|---|---|---|---|---|
| | 20 | orange | white | 80.9 | 75.6 | 16 | 328 |
| | 30 | light orange | off-white | 78.4 | 76.3 | 16 | 337 |
| | 50 | pale orange | tan | 74.2 | 74.2 | 10 | 408 |
| ethanol | 0 | pale orange | tan | 93.0 | 67.0 | 60 | 270 |
| | 10 | orange | white | 88.6 | 70.8 | 52 | 275 |
| | 20 | orange | white | 84.1 | 73.5 | 24 | 348 |
| | 30 | light orange | off-white | 79.3 | 74.6 | 15 | 365 |
| | 50 | pale orange | tan | 72.1 | 73.4 | 9 | 427 |
| isopropanol | 0 | pale orange | tan | 94.5 | 66.5 | 62 | 211 |
| | 10 | light orange | off-white | 92.6 | 67.9 | 59 | 237 |
| | 20 | orange | white | 90.5 | 69.2 | 55 | 262 |
| | 30 | light orange | off-white | 86.2 | 70.4 | 28 | 351 |
| | 50 | pale orange | tan | 71.4 | 71.8 | 12 | 427 |

There is effective colour removal as indicated by the white and off-white product colour, and a decrease in product yields. Colour extraction efficiency varies with the general extraction power of the solvent with methanol being more effective than ethanol and isopropanol being the least effective. However, by increasing the general extraction power of ethanol and isopropanol by the addition of small amounts of water colour extraction is increased but extraction with water levels in excess of 30% does not produce efficient colour removal.

Following is a result sheet of experiments using isopropanol with its extraction power increased by addition of water in different amounts and at different temperatures.

TABLE IV

Moist-Heat Treated Pea Flour
Aqueous Isopropanol Extraction
(30 min: 1:10 solvent ratio)

| Water % (V/V) | Temp. (°C.) | Solution Colour | Product Colour | Product Yield % | Product Protein % | AACC NSI % | Hydration Capacity By AACC Method 56-20 % |
|---|---|---|---|---|---|---|---|
| 0 | 82 | yellow | tan | 94.5 | 66.5 | 60 | 211 |
| 10 | 80 | orange | white | 91.8 | 68.8 | 59 | 318 |
| 10 | 70 | orange | white | 92.3 | 69.3 | 60 | 304 |
| 10 | 60 | yellow | tan | 92.6 | 67.9 | 59 | 237 |
| 10 | 40 | yellow | tan | 92.7 | 68.9 | 59 | 232 |
| 10 | 22 | yellow | tan | 93.1 | 68.3 | 61 | 218 |
| 15 | 80 | orange | white | 98.6 | 69.7 | 43 | 250 |
| 15 | 70 | orange | white | 98.8 | 69.9 | 58 | 299 |
| 15 | 60 | light orange | off-white | 98.9 | 67.7 | 60 | 278 |
| 20 | 80 | orange | white | 89.7 | 70.2 | 21 | 304 |
| 20 | 60 | light orange | off-white | 90.5 | 69.2 | 55 | 262 |
| 20 | 40 | pale orange | tan | 90.8 | 70.1 | 57 | 262 |
| 20 | 22 | pale orange | tan | 90.9 | 69.9 | 59 | 259 |
| 30 | 80 | light orange | off-white | 85.7 | 71.3 | 14 | 369 |
| 30 | 60 | light orange | off-white | 86.2 | 70.4 | 28 | 351 |
| 30 | 40 | pale orange | tan | 86.8 | 73.1 | 55 | 296 |
| 30 | 22 | pale orange | tan | 87.5 | 72.3 | 59 | 276 |
| 50 | 80 | pale orange | tan | 63.7 | 69.2 | 9 | 467 |
| 50 | 60 | pale orange | tan | 71.4 | 68.8 | 12 | 427 |
| 50 | 40 | pale orange | | | | | |

TABLE IV-continued
Moist-Heat Treated Pea Flour
Aqueous Isopropanol Extraction
(30 min: 1:10 solvent ratio)

| Water % (V/V) | Temp. (°C.) | Solution Colour | Product Colour | Product Yield % | Product Protein % | AACC NSI % | Hydration Capacity By AACC Method 56-20 % |
|---|---|---|---|---|---|---|---|
| 50 | 22 | orange | tan | 74.5 | 70.9 | 27 | 401 |
|  |  | pale orange | tan | 76.8 | 70.1 | 45 | 339 |

Colour extraction was increased by raising the temperature, but high temperature extractions with aqueous organic solvents of increasing general extraction power may lead to greater protein denaturation or lowered N.S.I. The N.S.I. of the starting pea protein flours for all of the foregoing extractions was about 60 and it is apparent that by arranging extraction conditions, pea protein flours debittered by moist heat treatment can be decoloured without any significant further reduction in N.S.I.

A further sample of steam treated yellow pea flour containing 57% protein, having an N.S.I. value of 56 and a hydration capacity of 225% was solvent extracted for one half of an hour as in the cases of the above noted tests and the residual solvent removed. The results thereof are summarized in Tables V and VI which follow. In every case the end product was white or off-white, an acceptable colour.

TABLE V
Moist-Heat Treated Pea Flour
Aqueous n-propanol Extraction
(30 min: 1:10 solvent ratio)

| Water % (v/v) | Temp. (°C.) | Product Yield % | Product Protein % | AACC NSI % | Hydration Capacity By AACC Method 56-20 % |
|---|---|---|---|---|---|
| 10 | 60 | 92.6 | 60.8 | 56 | 315 |
| 15 | 60 | 91.4 | 61.4 | 54 | 328 |
| 20 | 60 | 89.8 | 62.4 | 44 | 323 |
| 10 | 70 | 92.2 | 60.6 | 56 | 324 |
| 15 | 70 | 91.1 | 61.4 | 39 | 342 |
| 20 | 70 | 89.6 | 62.6 | 20 | 341 |
| 20 | 80 | 89.1 | 63.0 | 15 | 345 |

TABLE VI
Moist-Heat Treated Pea Flour
Extractions with solvent mixtures
(30 min: 1:10 solvent ratio)

| Solvent | % Composition | Temp. (°C.) | Product Yield % | Product Protein % | AACC NSI % | Hydration Capacity By AACC Method 56-20 % |
|---|---|---|---|---|---|---|
| ethanol | 100 | 70 | 91.3 | 61.6 | 54 | 324 |
| ethanol/hexane | 90/10 | 66 | 92.3 | 61.2 | 56 | 302 |
| ethanol/toluene | 90/10 | 70 | 91.9 | 61.0 | 56 | 325 |
| ethanol/chloroform | 90/10 | 70 | 91.9 | 62.2 | 51 | 334 |
| ethanol/water | 90/10 | 60 | 88.4 | 63.8 | 47 | 350 |
| ethanol/hexane/water | 80/10/10 | 60 | 89.4 | 61.8 | 50 | 320 |
| ethanol/toluene/water | 80/10/10 | 60 | 89.0 | 62.6 | 45 | 336 |
| ethanol/chloroform/water | 80/10/10 | 60 | 89.4 | 61.6 | 37 | 315 |
| ethanol/water | 80/10 | 60 | 87.9 | 62.4 | 44 | 309 |
| ethanol/water | 90/10 | 70 | 87.5 | 64.8 | 27 | 344 |
| ethanol/hexane/water | 80/10/10 | 62 | 89.1 | 63.0 | 40 | 292 |
| ethanol/toluene/water | 80/10/10 | 70 | 88.6 | 63.6 | 28 | 339 |
| ethanol/toluene/water | 70/20/10 | 70 | 89.6 | 63.6 | 22 | 325 |
| ethanol/chloroform/water | 80/10/10 | 70 | 88.5 | 64.0 | 21 | 354 |
| ethanol/chloroform/water | 70/20/10 | 65 | 89.8 | 61.6 | 20 | 334 |
| ethanol/chloroform/water | 60/20/20 | 65 | 86.7 | 65.0 | 13 | 358 |
| ethanol/toluene/water | 65/20/15 | 70 | 88.1 | 64.8 | 14 | 326 |
| ethanol/methanol/water | 80/10/10 | 70 | 87.2 | 64.6 | 26 | 330 |
| ethanol/isopropanol/water | 80/10/10 | 70 | 88.7 | 64.0 | 38 | 317 |
| ethanol/acetone/water | 80/10/10 | 70 | 88.2 | 65.2 | 32 | 322 |
| ethanol/acetone/water | 60/30/10 | 70 | 89.8 | 64.2 | 48 | 296 |
| ethanol/acetone/water | 45/45/10 | 66 | 90.9 | 62.2 | 56 | 310 |
| ethanol/isopropanol/water | 45/45/10 | 70 | 90.5 | 62.6 | 50 | 317 |
| ethanol/n-butanol/water | 45/45/10 | 70 | 91.3 | 61.0 | 40 | 303 |
| ethanol/acetone/water | 40/40/20 | 70 | 87.4 | 63.4 | 34 | 342 |

Table V is a table of test results using n-propanol as a solvent and it will be noted that the extraction power and the denaturing characteristics of n-propanol and water mixtures are similar to those of isopropanol and water mixtures.

In the extractions of Table VI ethanol with and without its extractive power increased by the addition of water is combined with other organic solvents including those not of the class of a C1, C2 or C3 monohydric alcohol and it will be noted that the end product is satisfactorily decoloured. The solvents other than the C1, C2 or C3 monohydric alcohol would not of themselves remove the orange-brown pigment and it has been found that if a mixture of solvents is used there must be at least enough of a C1, C2 or C3 monohydric alcohol solvent to remove the orange-brown colour. Tests have shown that it is only a C1, C2 or C3 monohydric alcohol that removes the orange-brown colour from the yellow pea protein product but the invention is not concerned with the use of these other solvents which may be effective in removing some of the other undesirable pigment. It is concerned with the use of the C1, C2 or C3 monohydric alcohol with or without other solvents for the purpose of removing the orange-brown or brown colour causing constituent whether it is invisible before heat treatment or visible after heat treatment.

When mixtures of water miscible solvents are used then the decolouring ability and denaturing ability are corelated with the extraction power of the solvent mixture. The purpose of adding water to the solvents of the invention is to increase the extraction power. Increases in temperature also increase the solvent extraction power.

Beyond certain levels of temperature and extraction power the decolouring effect is essentially complete and further increases mainly result in decreases in protein solubility. It is also possible that one might want to control the level of denaturation below that which would result from the application of minimum extraction powr to remove the orange coloured pigment for the purpose of controlling N.S.I.

The use of water immiscible or partially water miscible organic solvents such as hexane, toluene and chloroform have little effect on the extraction of the orange-brown pigment with the solvents of this invention and it appears from the results of Table VI that the alcohol solvents of the invention are responsible for extracting these particular pigments.

On the basis of large testing for colour extraction with methanol, ethanol, isopropanol and n-propanol good colour removal of the orange-brown pigment has been obtained under the following conditions.

| Solvent | Temperature | % Water in Solvent |
| --- | --- | --- |
| Methanol | 40° C. - Reflux | 0-5% |
| Ethanol | 40° C. - Reflux | 0-15% |
| Isopropanol | 40° C. - Reflux | 5-25% |
| n-propanol | 40° C. - Reflux | 5-25% |

Following are test results of an isopropanol extraction of extruded pea flour and roller dried pea flour.

TABLE VII

15% Aqueous Isopropanol Extraction at 80° C. of heat processed pea flour (30 min: 1:10 solvent ratio)

| Starting Material | Colour | | AACC - N.S.I. | |
| --- | --- | --- | --- | --- |
| | Starting Material | Product | Starting Material % | Product |
| Extruded pea flour | golden brown | off-white | 22 | 22 |
| Roller-dried pea flour | light brown | off-white | 28 | 26 |

The pea flours in Table VII had an orange-brown pigment which was the result of the heat treatment that it had undergone. Other tests with solvents of the invention on heat treated pea flours that had acquired an orange-brown pigment were successful in removing the orange-brown colour.

The solvents of the invention were also found capable of removing the orange-brown pigments of pea flours that were produced by aqueous processes such as acid washing, water washing and alkaline washing and subsequently dried by heat.

It has further been found that pea flour products not heat treated that apparently had no orange-brown colour when extracted with the solvents of this invention did not develop an orange-brown colour upon subsequent heat treatment that would have developed an orange-brown colour had they not been colour extracted in accordance with this invention.

As indicated, extraction times are empirical. Sufficient contact time with the solvent and product is necessary to achieve the colour extraction. In most cases with agitation a time of about five minutes was found satisfactory. While in most cases protein denaturation is rather insensitive to extraction time, it is always best to avoid an extended extraction time.

It was also noted that the extraction processes according to this invention tended to remove bitter and pea flavours in raw flour and in flour that had been previously heat treated to remove bitter flavour.

In each case the residual solvent was removed from the product by a suitable method and in most cases heat and/or vacuum techniques were used. It has been found that the residual alcohol can be removed without reductions in N.S.I. and that it can be done at low temperatures (below 50° C.) under vacuum. It can also be done at higher temperatures with similar effect. A particularly effective method of removing residual alcohol solvent is to use steam. It has been found that the N.S.I. of the alcohol extractive products of this invention are relatively insensitive to steam treatment. Steam treatment following extraction does not result in the development of further orange-brown pigments and it is evident that the chemical precursors of the orange-brown pigments which develop on nonprocessed moist heat treatment have been removed by the alcohol extraction processes described in this invention.

The class of alcohols found to be effective is the C1, C2 or C3 monohydric alcohols, i.e. methanol, ethanol, isopropanol and n-propanol.

What I claim as my invention is:

1. A method of removing orange-brown colour causing constituents from moist, heat treated yellow pea flour in the manufacture of a high protein pea flour which comprises the steps of extracting said heat treated flour with a solvent selected from the group consisting of a C1, C2 or C3 monohydric alcohol at a temperature above 40° C. said solvent containing not more than 30% water by volume in order to increase the extraction power of said solvent thereby removing the brown colour causing constituents and then removing the residual solvent from the flour.

2. A method of removing colour causing constituents from yellow pea flour as claimed in claim 1 in which the monohydric alcohol of said solvent comprises a mixture of two or more C1, C2 or C3 monohydric alcohols.

3. A method of removing colour causing constituents from yellow pea flour as claimed in claim 1, wherein the pea flour has previously been heat treated to cause it to have an orange-brown colour.

4. A method of removing colour causing constituents from yellow pea flour as claimed in claim 1, wherein the pea flour has not been previously heat treated to cause change of colour.

5. A method of removing colour causing constituents from yellow pea flour as claimed in claim 2 wherein the pea flour has not been previously heat treated to cause change of colour.

6. A method of removing colour causing constituents from yellow pea flour as claimed in claim 2 wherein the pea flour has previously been heat treated to cause it to have an orange-brown colour.

* * * * *